(12) United States Patent
Harasawa

(10) Patent No.: US 12,719,998 B2
(45) Date of Patent: Aug. 25, 2026

(54) PRINTING CONTROL DEVICE, PRINTING CONTROL METHOD, AND NON-TRANSITORY COMPUTER READABLE MEDIUM FOR COLOR MATERIAL REPLACEMENT

(71) Applicant: FUJIFILM Business Innovation Corp., Tokyo (JP)

(72) Inventor: Toyohiro Harasawa, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/182,447

(22) Filed: Mar. 13, 2023

(65) Prior Publication Data

US 2024/0073349 A1 Feb. 29, 2024

(30) Foreign Application Priority Data

Aug. 29, 2022 (JP) ................................. 2022-136319

(51) Int. Cl.
*H04N 1/60* (2006.01)
*G06F 3/12* (2006.01)

(52) U.S. Cl.
CPC ......... *H04N 1/6008* (2013.01); *G06F 3/1208* (2013.01); *G06F 3/1263* (2013.01)

(58) Field of Classification Search
CPC ............. H04N 1/6008; H04N 1/00535; H04N 1/00559; G06F 3/1208; G06F 3/1263
USPC .... 358/1.9, 3.24, 3.27, 1.13; 399/13, 25, 27, 399/54, 111, 112
See application file for complete search history.

(56) References Cited

U.S. PATENT DOCUMENTS

2021/0206986 A1* 7/2021 Sonntag .................. H04N 1/60

FOREIGN PATENT DOCUMENTS

| | | | |
|---|---|---|---|
| JP | 2006-339073 | A | 12/2006 |
| JP | 2008-151971 | A | 7/2008 |
| JP | 2014-021876 | A | 2/2014 |
| JP | 2017-62308 | A | 3/2017 |
| JP | 2021-189194 | A | 12/2021 |

OTHER PUBLICATIONS

Mar. 24, 2026 Office Action issued in Japanese Application No. 2022-136319.

* cited by examiner

*Primary Examiner* — Jamares Q Washington
(74) *Attorney, Agent, or Firm* — Oliff PLC

(57) ABSTRACT

A printing control device includes a processor configured to: in a case where the number of colors of a first color group including one or more colors included in print data is larger than the number of colors of a second color group including one or more colors that are able to be printed by a printing unit and a color material of a color that has not been printed from the first color group is not attached to the printing unit, issue an instruction to replace any color material attached to the printing unit with the color material of the color that has not been printed from the first color group; and after the color material is replaced, cause the printing unit to print the color that has not been printed from the first color group.

16 Claims, 11 Drawing Sheets

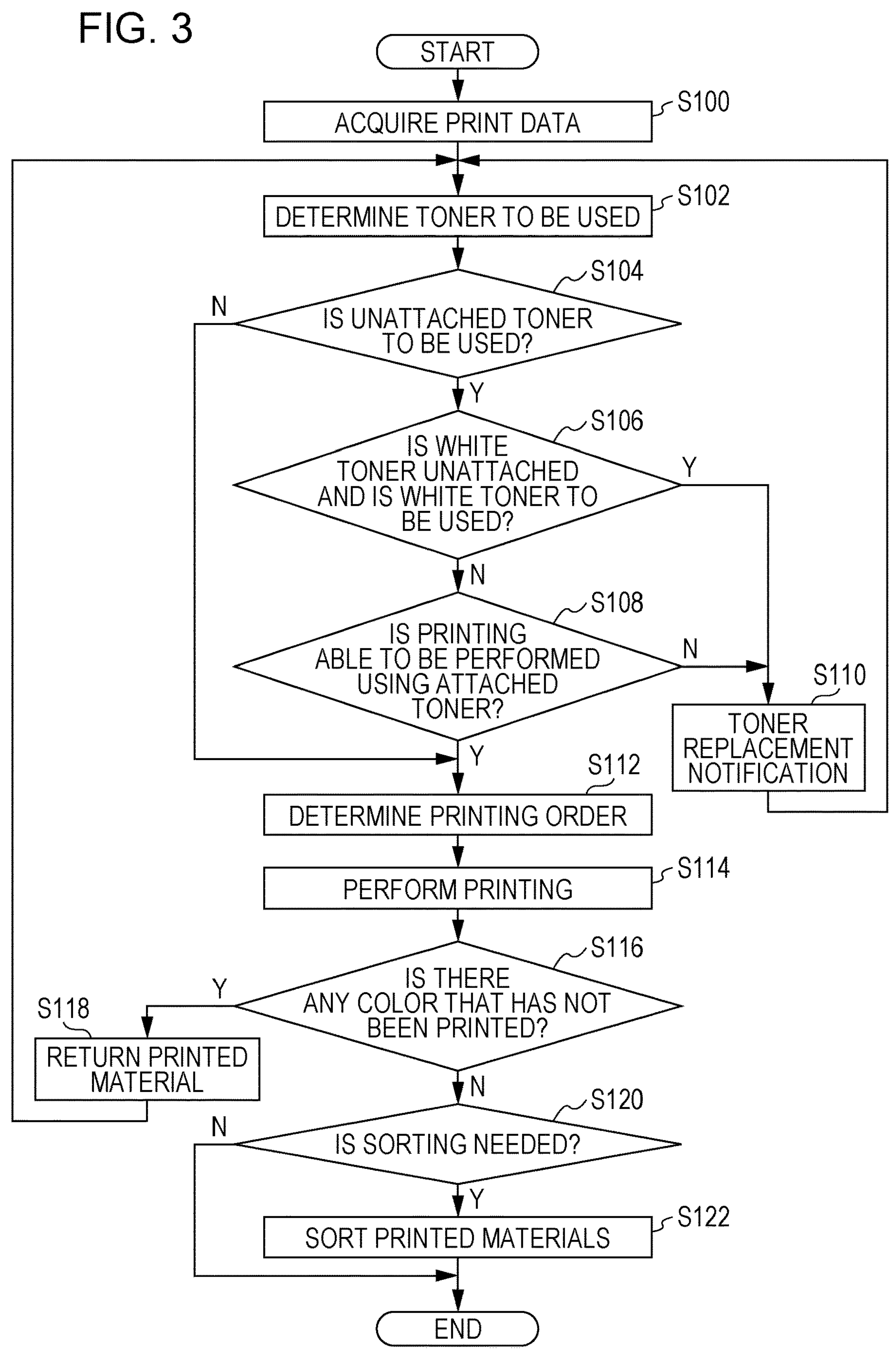
FIG. 3
START
ACQUIRE PRINT DATA
S100
DETERMINE TONER TO BE USED
S102
IS UNATTACHED TONER TO BE USED?
S104
N
Y
IS WHITE TONER UNATTACHED AND IS WHITE TONER TO BE USED?
S106
Y
N
IS PRINTING ABLE TO BE PERFORMED USING ATTACHED TONER?
S108
N
Y
S110
TONER REPLACEMENT NOTIFICATION
S112
DETERMINE PRINTING ORDER
PERFORM PRINTING
S114
IS THERE ANY COLOR THAT HAS NOT BEEN PRINTED?
S116
Y
S118
RETURN PRINTED MATERIAL
N
IS SORTING NEEDED?
S120
N
Y
SORT PRINTED MATERIALS
S122
END

PRINTING CONTROL DEVICE, PRINTING CONTROL METHOD, AND NON-TRANSITORY COMPUTER READABLE MEDIUM FOR COLOR MATERIAL REPLACEMENT

CROSS-REFERENCE TO RELATED APPLICATIONS

This application is based on and claims priority under 35 USC 119 from Japanese Patent Application No. 2022-136319 filed Aug. 29, 2022.

BACKGROUND

(i) Technical Field

The present disclosure relates to a printing control device, a printing control method, and a non-transitory computer readable medium.

(ii) Related Art

In Japanese Unexamined Patent Application Publication No. 2008-151971, an image forming apparatus that includes determining means for analyzing data regarding an image to be printed and determining the order of superposition of toners of a plurality of colors used for printing of the image, and specifying means for specifying set positions of toner cartridges for a plurality of colors according to the order of superposition of the toners determined by the determining means, is disclosed.

In Japanese Unexamined Patent Application Publication No. 2014-021876, a printing system in which at least a printer that includes CMYK toners, a printer that includes a toner different from the CMYK toners, and a computer device that issues a printing instruction are connected through a communication network is disclosed. In the printing system, the computer device includes a printer driver corresponding to each of the printers. The printer drivers are capable of creating print data for instructing the corresponding printers to perform printing. A predetermined printer that has received the print data analyzes the print data and determines whether printing processing needs to be performed by a different printer. In the case where it is determined that the printing processing needs to be performed by the different printer, the predetermined printer determines, based on printing contents identified based on the print data, whether printing processing by the predetermined printer is to be performed prior to the printing processing by the different printer. In the case where it is determined that the printing processing by the predetermined printer is to be performed earlier than the printing processing by the different printer, the predetermined printer performs the printing processing based on the print data and transfers the print data to the different printer while instructing the different printer to store the print data. In the case where it is determined that the printing processing by the predetermined printer is to be performed later than the printing processing by the different printer, the predetermined printer stores the print data as a saved job, transfers the print data to the different printer while instructing the different printer to output the print data, and performs the printing processing based on the saved job for a printed material obtained by the printing processing performed by the different printer. When receiving the print data that is instructed to be stored and is transferred from the predetermined printer, the different printer stores the print data as a saved job and performs the printing processing based on the saved job for a printed material obtained by the printing processing performed by the predetermined printer. When receiving the print data that is instructed to be output and is transferred from the predetermined printer, the different printer performs the printing processing based on the print data.

SUMMARY

Aspects of non-limiting embodiments of the present disclosure relate to providing a printing control device, a printing control method, and a non-transitory computer readable medium capable of printing print data including colors, the number of colors included in the print data being larger than the number of colors that are able to be printed by a printing unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printing control device including a processor configured to: in a case where the number of colors of a first color group including one or more colors included in print data is larger than the number of colors of a second color group including one or more colors that are able to be printed by a printing unit and a color material of a color that has not been printed from the first color group is not attached to the printing unit, issue an instruction to replace any color material attached to the printing unit with the color material of the color that has not been printed from the first color group; and after the color material is replaced, cause the printing unit to print the color that has not been printed from the first color group.

BRIEF DESCRIPTION OF THE DRAWINGS

Exemplary embodiments of the present disclosure will be described in detail based on the following figures, wherein:

FIG. 2 is a block diagram illustrating an example of the configuration of a printer including a printing control device according to an exemplary embodiment, a printing unit, and the like;

FIG. 3 is a flowchart illustrating the flow of a process based on a printing control program;

FIG. 6 is a diagram illustrating an example of a first notification output to a personal computer;

FIG. 7 is a diagram illustrating an example of a first notification output to a display unit;

FIG. 10 is a diagram illustrating an example of a second notification output to a personal computer;

FIG. 11 is a diagram illustrating an example of a second notification output to a display unit;

DETAILED DESCRIPTION

Examples of exemplary embodiments of the present disclosure will be described below with reference to drawings.

First, the overview of an exemplary embodiment of the present disclosure will be described.

Figure 1:
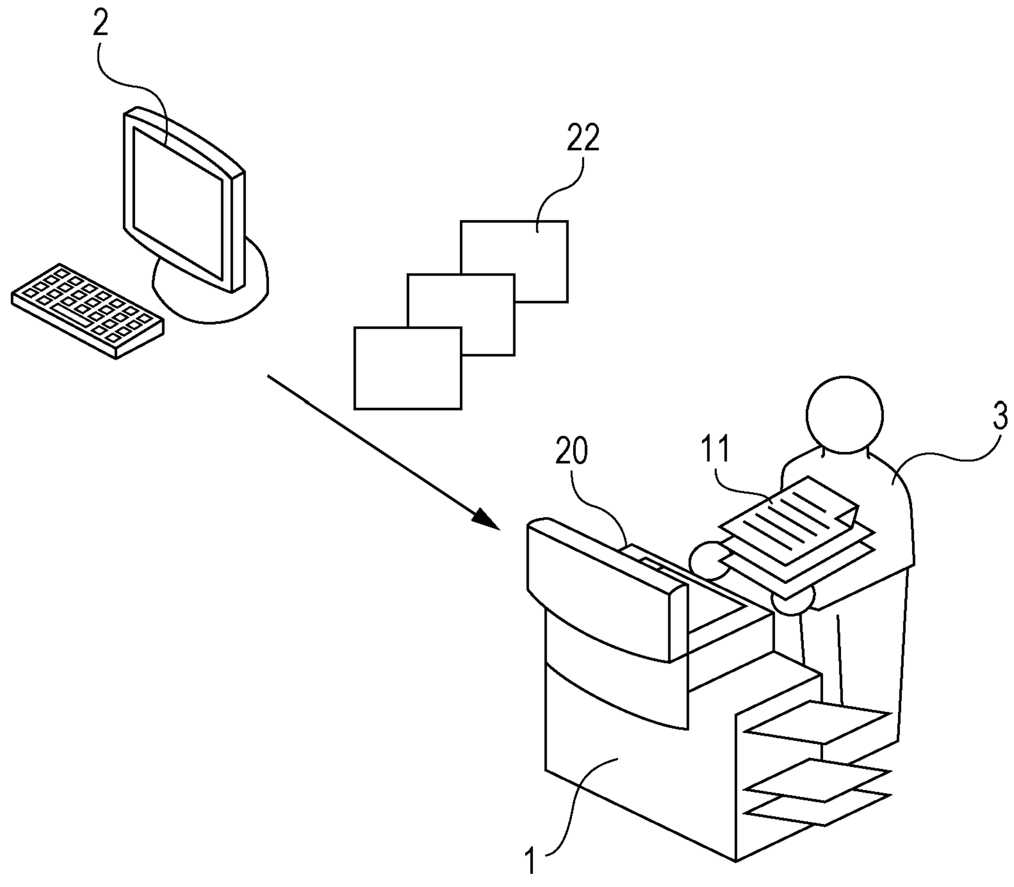
FIG. 1 is a diagram for explaining a case where a printer including a printing control device according to an exemplary embodiment is used by a user.

FIG. 1 is a diagram schematically illustrating a case where a printer 1 including a printing control device 10 according to an exemplary embodiment is used by a user 3. For example, the user 3 outputs document data 22 stored inside a personal computer (PC) 2 to the printer 1. The printer 1 acquires the document data 22 and performs printing processing. Alternatively, the user 3 sets a document 11 on a scanner 20 provided in the printer 1. The printer 1 performs printing processing for electronic data that has been obtained by reading the set document 11. The acquired document data 22 output from the PC 2 and the electronic data acquired by causing the scanner 20 to read the document 11 are examples of print data.

When the printing processing is completed, the printer 1 discharges a printed material. The printed material is a recording medium on which an image is formed by the printing processing. Paper is an example of the recording medium.

Next, an example of the configuration of the printing control device 10 according to an exemplary embodiment will be described.

Figure 2:
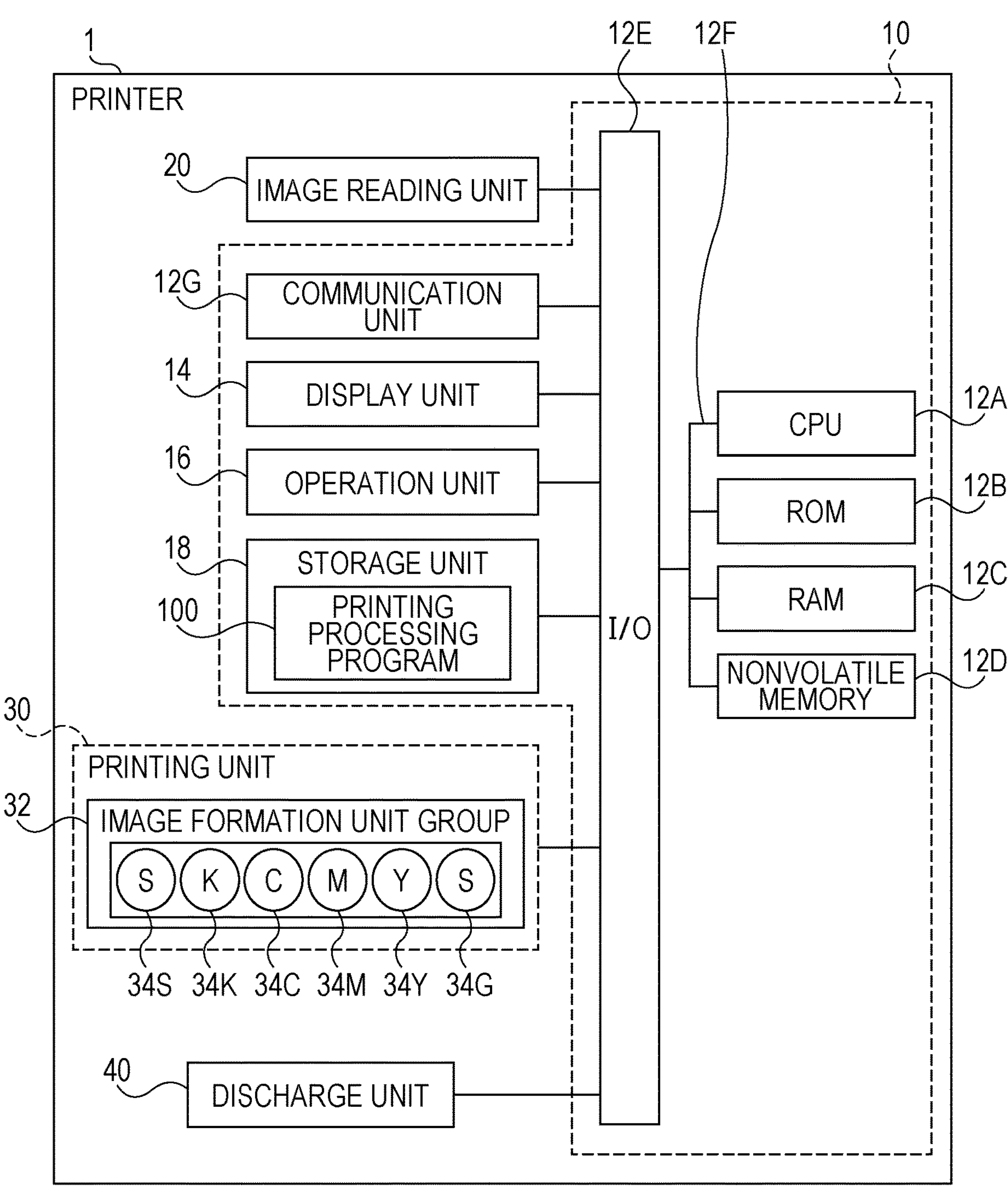

FIG. 2 is a block diagram illustrating an example of the configuration of the printer 1 according to an exemplary embodiment. The printer 1 includes the printing control device 10, the scanner 20, a printing unit 30, and a discharge unit 40. Although an example in which the printing control device 10 is included in the printer 1 will be described below, the printing control device 10 may be an external device that is connected to the printer 1 in such a manner that the external device and the printer 1 are able to communicate with each other.

The printing control device 10 includes configuration units such as a central processing unit (CPU) 12A. a read only memory (ROM) 12B, a random access memory (RAM) 12C, a nonvolatile memory 12D, an input/output interface (I/O) unit 12E, a communication unit 12G, a display unit 14, an operation unit 16, and a storage unit 18.

The CPU 12A reads a printing control program 100 (see FIG. 3), which will be described later, and other various programs from, for example, the storage unit 18. The CPU 12A controls the configuration units of the printing control device 10, and the scanner 20 and the printing unit 30, which will be described later, by executing the read program while using the RAM 12C as a working area. The CPU 12A is an example of a processor.

The CPU 12A, the ROM 12B, the RAM 12C, the nonvolatile memory 12D, and the I/O unit 12E are connected to one another through a bus 12F in such a manner that they are able to communicate with one another.

For example, the communication unit 12G is connected to an external device outside the printer 1 in such a manner that the communication unit 12G and the external device are able to communicate with each other in a wired or wireless manner. The PC 2 is an example of an external device. The printer 1 acquires, through the communication unit 12G, the document data 22 output from the PC 2.

The display unit 14 includes, for example, a combination of a liquid crystal display, an organic electroluminescence (EL) display, or the like and a touch panel.

The operation unit 16 includes, for example, a power button, an operation button, and the like provided at the printer 1.

The storage unit 18 is, for example, a solid state drive (SSD) or a hard disk drive (HDD). The storage unit 18 stores the printing control program 100, acquired print data, and the like.

The scanner 20 includes a charge-coupled device (CCD) image sensor or the like that reads the document 11 set on the printer 1 to generate data of the document 11.

The printing unit 30 includes an image formation toner unit group 32 and performs printing based on print data. The image formation toner unit group 32 illustrated in FIG. 2 includes a gold toner unit 34G, a yellow toner unit 34Y, a magenta toner unit 34M, a cyan toner unit 34C, a black toner unit 34K, and a silver toner unit 34S. Hereinafter, a toner unit of a color, a color of a toner, and a color included in print data will not be distinguished from one another and will be denoted by the same sign. For example, a toner unit of a color, a color of a toner, and a color included in print data will be referred to as a yellow toner unit 34Y, a yellow toner 34Y, and yellow 34Y. Furthermore, in the case where toner units included in the image formation toner unit group 32 are not distinguished from one another, they will be simply described as toner units 34.

Each of the toner units 34 includes a photoreceptor drum, which is not illustrated in FIG. 2. The toner unit 34 forms a toner image on a surface of the photoreceptor drum using an electrophotographic system, transfers the toner image to an intermediate transfer belt, which is not illustrated, and transfers the transferred toner image to a recording medium. Thus, an image based on the print data is formed on the recording medium.

Colors of the toners included in the toner units 34 attached to the image formation toner unit group 32 are an example of a second color group. The number of colors in the second color group illustrated in FIG. 2 is six. The yellow 34Y, the magenta 34M, the cyan 34C, and the black 34K are examples of basic colors. The gold 34G and the silver 34S are examples of special colors. Other examples of special colors include white 34W, transparent 34C1, and pink 34P. The transparent 34C1 is a color for coating a color that has already been printed. The white 34W is an example of an underlying color. The underlying color that indicates the color of the base is a color that is printed firstly at the time when colors based on print data are printed.

The silver toner 34S, the yellow toner 34Y, the magenta toner 34M, the cyan toner 34C, the black toner 34K, and the gold toner 34G are examples of color materials.

Furthermore, settings of the image formation toner unit group 32 may be changed in a process regarding printing. That is, at least one of the toner units attached to the image formation toner unit group 32 may be replaced with another toner unit. Specifically, in the case where the number of colors used in print data is larger than the number of colors included in the second color group and a toner of a color not included in the second color group is used for printing, at least one toner unit attached to the image formation toner unit group 32 is able to be replaced with a toner unit that is necessary for printing. Colors used in print data will be referred to as a first color group.

The discharge unit 40 is, for example, a tray to which a printed material printed by the printer 1 is discharged.

The scanner 20, the printing unit 30, and the discharge unit 40 are connected to the printing control device 10 through the I/O unit 12E in such a manner that they are able to communicate with one another.

Next, an operation of the printing control device 10 will be described. FIG. 3 is a flowchart illustrating the flow of a process based on the printing control program 100. The printing control program 100 is executed by the CPU 12A. Processing of steps S100 to S122, which will be described below, is repeated every time that print data is acquired.

It is assumed that the toner units of the gold 34G, the yellow 34Y, the magenta 34M, the cyan 34C, the black 34K, and the silver 34S, through which a recording medium passes in this order, are attached to the image formation toner unit group 32 at the default settings in that order from the first to the last.

In step S100, the CPU 12A acquires print data. Examples of print data acquired by the CPU 12A is illustrated in FIGS. 4 and 5.

Figure 4:
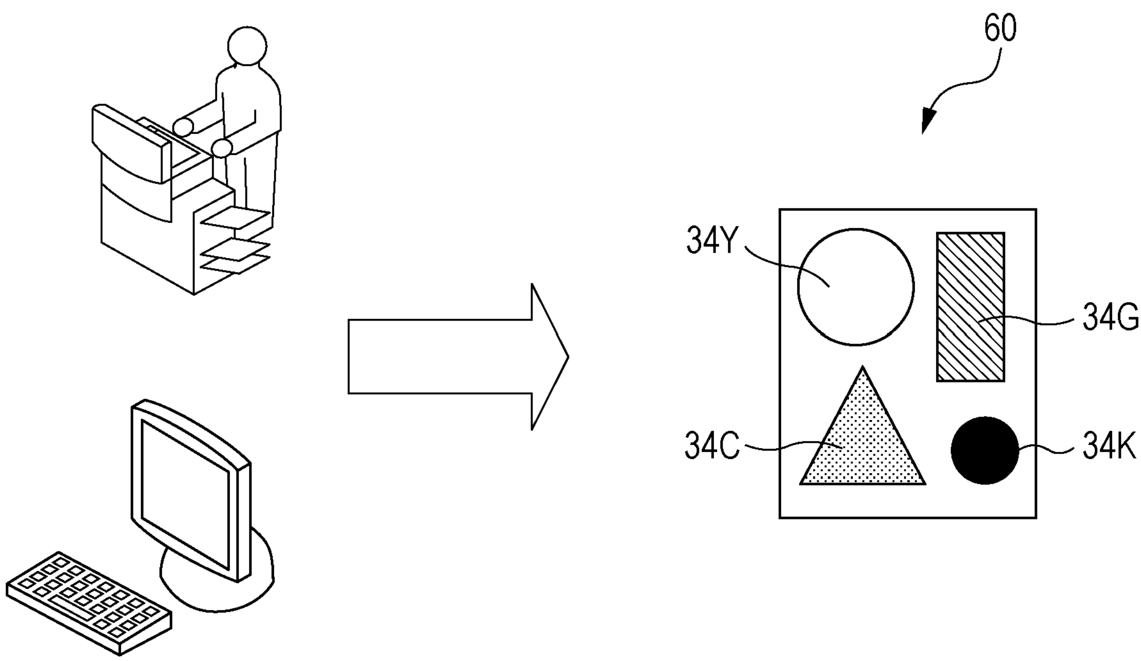
FIG. 4 is a diagram illustrating an example of print data.

Print data 60 illustrated in FIG. 4 is an example of print data acquired by the PC 2 or the scanner 20. The print data 60 is a page including four colors: the yellow 34Y, the gold 34G, the cyan 34C, and the black 34, as the first color group.

Figure 5:
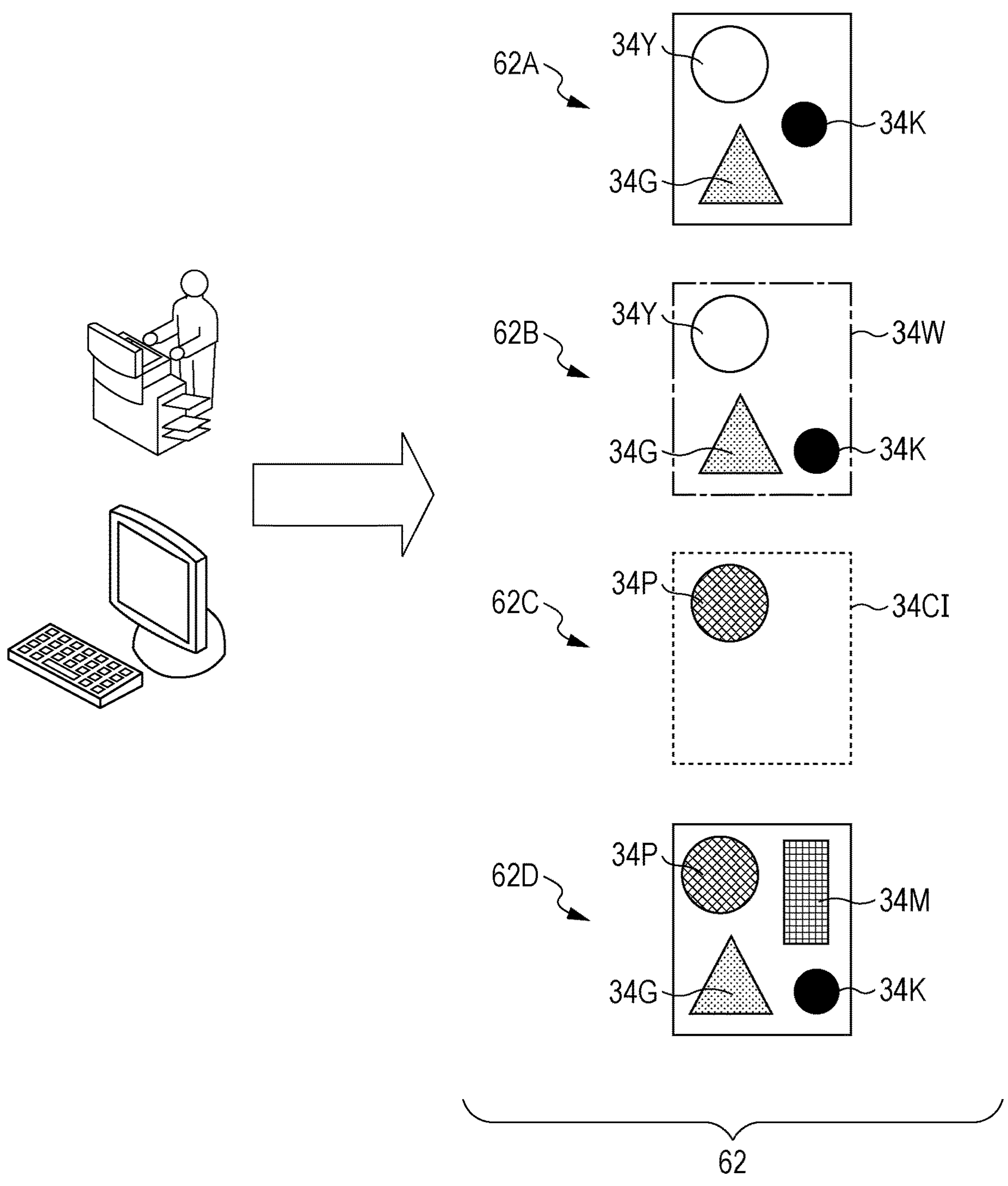
FIG. 5 is a diagram illustrating another example of print data.

Print data 62 illustrated in FIG. 5 is another example of print data acquired by the PC 2 or the scanner 20. The print data 62 includes four pages: a page 62A, a page 62B, a page 62C, and a page 62D. The first color group of the print data 62 includes seven colors: the yellow 34Y, the gold 34G, the black 34K, the magenta 34M, the pink 34P, the transparent 34C1, and the white 34W.

In step S102, the CPU 12A analyzes colors used in the acquired print data, and determines colors of toners to be used for printing (processing of step S114). The details of this processing will be described with reference to FIG. 4. In the example of FIG. 4, the CPU 12A analyzes colors used in the print data 60, and determines that the yellow toner 34Y, the gold toner 34G, the cyan toner 34C, and the black toner 34K will be used for printing. The colors of the toners to be used for printing that are determined in the first processing of step S102 in FIG. 4 are the same as the colors included in the first color group.

In step S104, the CPU 12A determines whether or not the colors of the toners that have been determined to be used for printing include a color different from the colors of the toner units attached to the image formation toner unit group 32 at the latest settings of the image formation toner unit group 32. The latest settings of the image formation toner unit group 32 represent settings of the image formation toner unit group 32 at the time when the processing of step S104 is performed.

More particularly, for example, the CPU 12A acquires information regarding the latest settings of the image formation toner unit group 32 and performs determination by comparing the acquired information with the colors of the toners that have been determined to be used for printing. The information regarding the latest settings of the image formation toner unit group 32 represents data of attached toner units at the latest settings of the image formation toner unit group 32.

In the case where the result of the determination in step S104 is affirmative (Y in step S104), that is, in the case where the colors of the toners that have been determined to be used for printing include a color different from the colors of the toner units attached at the latest settings of the image formation toner unit group 32, the process proceeds to step S106. In the case where the result of the determination in step S104 is negative (N in step S104), that is, in the case where the colors of the toners that have been determined to be used for printing are included in the colors of the toner units attached at the latest settings of the image formation toner unit group 32, the process proceeds to step S112.

In the example of FIG. 4, in the determination in step S104, the colors included in the first color group and the colors of the toners that have been determined to be used for printing are the same. Furthermore, the colors included in the first color group do not include a color different from the colors of the toner units attached at the latest settings of the image formation toner unit group 32. Thus, the result of the determination in step S104 is negative.

In step S106, the CPU 12A determines whether or not the toner units that are not attached at the latest settings of the image formation toner unit group 32 include the white toner unit 34W, and at the same time, determines whether or not the colors of the toners that have been determined to be used for printing include the white toner 34W. The white toner 34W is an example of a color material.

In the case where the results of both the determinations are affirmative (Y in step S106), that is, in the case where the white toner unit 34W is not attached at the latest settings of the image formation toner unit group 32 and the white toner 34W is determined to be used for printing, the process proceeds to step S110. In the case where the results of the determinations in step S106 are negative (N in step S106), that is, in the case where the white toner unit 34W is attached at the latest settings of the image formation toner unit group 32 or the colors of the toners that have been determined to be used for printing do not include the white toner 34W, the process proceeds to step S108.

In step S108, the CPU 12A determines whether or not printing is able to be performed using the toner units attached at the latest settings of the image formation toner unit group 32. More particularly, the CPU 12A determines, based on the information regarding the latest settings acquired in step S104, the print data, and the like, whether or not the colors of the toners that have been determined to be used for printing are able to be printed using the colors of the toner units attached at the latest settings of the image formation toner unit group 32. In the case where the result of the determination in step S108 is affirmative (Y in step S108), that is, in the case where printing using the toner units attached to the image formation toner unit group 32 of the latest settings is able to be performed, the process proceeds to step S112. In the case where the result of the determination in step S108 is negative (N in step S108), that is, in the case where the colors of the toners that have been determined to be used for printing are not able to be printed using the toner units attached to the image formation toner unit group 32 of the latest settings, the process proceeds to step S110.

In step S110, the CPU 12A outputs a notification indicating an instruction for replacing at least one toner unit attached at the latest settings of the image formation toner unit group 32 with a toner unit that is necessary for printing. Any toner unit attached to the image formation toner unit group 32 may be specified, and a notification of an instruction for replacing the specified toner unit with a toner unit of another color may be provided.

Figures 6, 7:
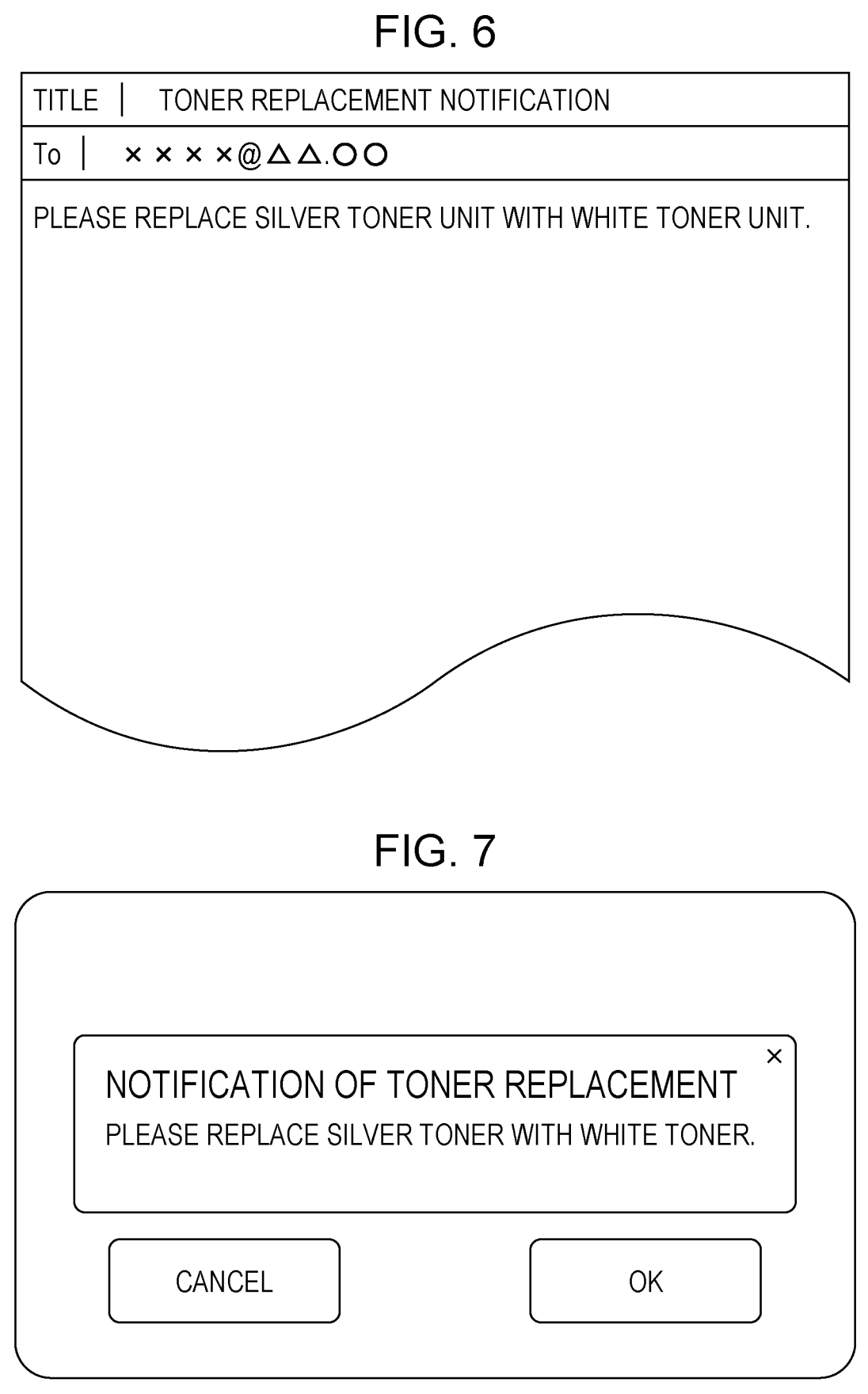

FIG. 6 is a diagram illustrating an example of a notification output to the PC 2. In the example illustrated in FIG. 6, for example, a notification e-mail transmitted to the PC 2 on the basis of an e-mail address of the user 3 stored in the storage unit 18 is illustrated. The user 3 checks the notification e-mail that has reached the PC 2 and, for example, is able to replace the specified silver toner unit 34S of the image formation toner unit group 32 at the default settings with the white toner unit 34W, in response to an instruction in the notification e-mail.

FIG. 7 is a diagram illustrating an example of a notification output to the display unit 14. In the example of FIG. 7, a notification image displayed on the display unit 14 is illustrated. The user 3 checks the notification image displayed on the display unit 14 and is able to replace at least one specified toner unit of the image formation toner unit group 32 with a toner unit of another color, in response to an instruction in the notification image. In the example illustrated in FIG. 7, the user 3 is able to replace the silver toner unit 34S attached to the image formation toner unit group 32 at the default settings with the white toner unit 34W.

When the user 3 completes replacement of the toner unit, the CPU 12A repeatedly performs the processing of step S102 and later steps for the print data.

In step S112, the CPU 12A determines the printing order of the colors of the toners that have been determined to be used for printing. The determined order is an example of a printing order. For example, the printing order is determined based on the order in which a recording medium passes through the toner units attached to the image formation toner unit group 32. That is, the order of printing the colors of the toners that have been determined to be used for printing, among the colors included in the first color group, is determined in such a manner that the color of a toner unit attached to a position of the image formation toner unit group 32 through which a recording medium passes firstly will be printed firstly and the color of a toner unit attached to a position of the image formation toner unit group 32 through which the recording medium passes secondly will be printed secondly. In the print data 60 illustrated in FIG. 4, for example, in accordance with the order in which the recording medium passes through the toner units attached at the default settings of the image formation toner unit group 32, the printing order is determined in the following order from the first to the fourth: the gold 34G, the yellow 34Y, the cyan 34C, and the black 34K.

In the case where the first color group includes a color to be printed firstly or a color to be printed lastly, the printing order of the color to be printed firstly or the color to be printed lastly may be prioritized. Specifically, in the case where the first color group includes an underlying color, the underlying color is determined to be printed firstly. This is because the underlying color is used to clearly reproduce colors and is thus desirably printed earlier than other colors. Furthermore, in the case where the first color group includes the transparent 34C1 and a color different from the transparent 34C1, the order is determined in such a manner that the color different from the transparent 34C1 is printed earlier than the transparent 34C1. This is because the transparent color is used to coat a printed color and the transparent 34C1 is desirably printed lastly as a finish after printing of the color different from the transparent 34C1 is completed.

In step S114, the CPU 12A performs printing based on the determined printing order and the print data. The recording medium on which printing is completed is discharged as a printed material and is accumulated in the discharge unit 40.

In step S116, the CPU 12A determines whether or not there is a color that has not been printed. The determination as to whether or not there is a color that has not been printed is based on, for example, a determination as to whether or not all the colors of the toners that have been determined to be used for printing in step S102 have been printed in step S114. In the case where the result of the determination in step S116 is affirmative (Y in step S116), that is, in the case where printing using all the colors included in the first color group is not completed for all the pages in the print data, the process proceeds to step S118. In the case where the result of the determination in step S116 is negative (N in step S116), that is, in the case where printing using the colors included in the first color group is completed for all the pages of the print data, the process proceeds to step S120.

In the case of the print data 60 in FIG. 4, printing using the colors included in the first color group is completed by a single printing operation. Thus, the result of the determination in step S116 is negative.

In step S118, the CPU 12A returns the printed material(s) accumulated in the discharge unit 40 to the printer 1. Thus, the processing of step S102 and later steps based on the print data is able to be performed repeatedly for the printed material(s) on which one or more printing operations have been performed. The CPU 12A repeatedly performs the processing of step S102 and later steps until the result of the determination in step S116 becomes negative.

In step S120, the CPU 12A determines whether or not the printed materials accumulated in the discharge unit 40 need to be sorted. Sorting is rearranging the printed materials accumulated in the discharge unit 40 into a specific order. In the case where the result of the determination in step S120 is affirmative (Y in step S120), the process proceeds to step S122. In the case where the result of the determination in step S120 is negative (N in step S120), the CPU 12A ends the process based on the printing control program 100.

The print data 60 in the example illustrated in FIG. 4 has one page. Therefore, the result of the determination in step S120 is negative.

In step S122, the CPU 12A sorts the printed materials accumulated in the discharge unit 40. Specifically, the CPU 12A captures the printed materials into the printer 1, sorts the captured printed materials, using a sorting mechanism, which is not illustrated in drawings, into the order of pages of the print data, and discharges the sorted printed materials to the discharge unit 40. After performing the processing of step S122, the CPU 12A ends the process based on the printing control program 100.

The CPU 12A may repeatedly performs the processing of steps S102 to S118 a plurality of times for a single piece of print data. More particularly, the CPU 12A repeatedly performs the processing of steps S102 to S118 a plurality of times for the print data 60 illustrated in FIG. 5. The details of the processing performed for the print data 60 by the CPU 12A will be described in detail below. In the description provided below, the number of times that the processing is performed will be clearly stated.

First, in step S100, the CPU 12A acquires the print data 62 from the PC 2 or the scanner 20.

In the first processing of step S102, the CPU 12A analyzes colors used in the print data 62 and determines that the yellow toner 34Y, the gold toner 34G, and the black toner 34K will be used for a page 62A, the yellow toner 34Y, the gold toner 34G, the black toner 34K, and the white toner 34W will be used for a page 62B, the pink toner 34P and the transparent toner 34C1 will be used for a page 62C, and the pink toner 34P, the gold toner 34G, the magenta toner 34M, and the black toner 34K will be used for a page 62D. The pink toner 34P and the transparent toner 34C1 are examples of color materials.

In the first processing of step S104, since the white 34W in the page 62B, the pink 34P and the transparent 34C1 in the page 62C, and the pink 34P in the page 62D are colors of toner units that are not attached at the default settings of the image formation toner unit group 32, the result of the determination in step S104 is affirmative.

In the first processing of step S106, since the white toner unit 34W is not attached at the default settings of the image formation toner unit group 32 and the white toner 34W is used in the page 62B, the result of the determination is affirmative.

In the first processing of step S110, for example, a notification illustrated in FIG. 6 or FIG. 7 is output. When the silver toner unit 34S attached to the image formation toner unit group 32 at the default settings is replaced with the white toner unit 34W in response to the notification, the second processing of step S102 is performed for the print data 62. Replacement of the toner unit in the first processing of step S110 is the first toner unit replacement in the processing for the print data 62.

The second processing of step S102 is similar to the first processing of step S102. The second processing of step S104 is also similar to the first processing of step S104.

In the second processing of step S106, since the white toner unit 34W is attached at the latest settings of the image formation toner unit group 32, the result of the determination is negative.

In the first processing of step S108, since the yellow 34Y, the gold 34G, and the black 34K for the page 62A, the yellow 34Y, the gold 34G, the black 34K, and the white 34W for the page 62B, and the gold 34G, the magenta 34M, and the black 34K for the page 62D are able to be printed using the toner units attached to the image formation toner unit group 32 at the latest settings, the result of the determination in the first processing of step S108 is affirmative.

In the first processing of step S112, the printing order for the print data 62 is determined as described below. The printing order for the page 62A is determined in the following order from the first to the third: the gold 34G, the yellow 34Y, and the black 34K. Furthermore, since the white 34W is used for the page 62B, the printing order for the page 62B is determined in such a manner that the white 34W will be printed firstly. Furthermore, since an attached toner is not used and printing is thus not performed for the page 62C, the printing order for the page 62C is not determined. The printing order for the page 62D is determined in the following order from the first to the third: the gold 34G, the magenta 34M, and the black 34K.

In the first processing of step S114, the CPU 12A performs, based on the page 62A of the print data 62, printing using the gold toner 34G, the yellow toner 34Y, and the black toner 34K. Furthermore, the CPU 12A performs, based on the page 62B of the print data 62, printing using the white toner 34W. Furthermore, the CPU 12A performs, based on the page 62D of the print data 62, printing using the gold toner 34G, the magenta toner 34M, and the black toner 34K.

Figure 8:
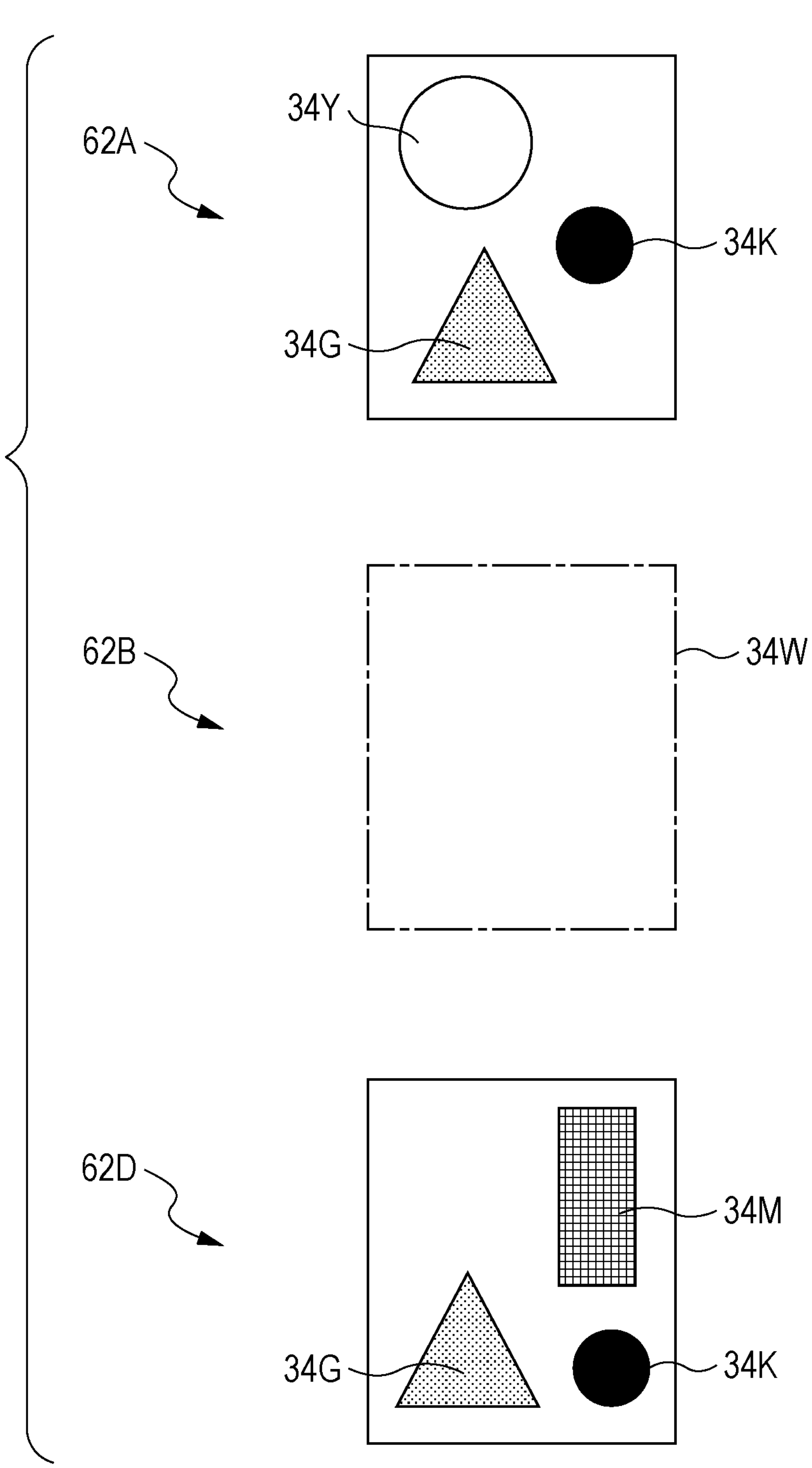
FIG. 8 is a diagram illustrating first printed materials.

FIG. 8 is a diagram illustrating printed materials discharged to the discharge unit 40 by printing in the first processing of step S114. As the printed materials by the first printing processing based on the print data 62, printed materials of three pages are discharged in the order of the page 62A, the page 62B, and the page 62D. Hereinafter, printed materials discharged by the first printing processing will be referred to as the first printed materials.

In the first processing of step S116, since printing of the page 62B using the gold toner 34G, the yellow toner 34Y, and the black toner 34K that have been determined to be used in the second processing of step S102 is not performed in the first processing of step S114 and printing of the page 62C using the pink 34P and the transparent 34C1 and printing of the page 62D using the pink 34P are not performed in the first processing of step S114, the result of the determination in the first processing of step S116 is affirmative.

In the first processing of step S118, the first printed materials accumulated in the discharge unit 40 are returned to the printer 1. When the first printed materials are returned to the printer 1, the CPU 12A performs the processing of step S102 again.

The page 62A, the white 34W in the page 62B, the gold 34G, the magenta 34M, and the black 34K in the page 62D are printed in the first printing processing.

Thus, in the third processing of step S102, the CPU 12A determines that the gold toner 34G, the yellow toner 34Y, and the black toner 34K will be used for the page 62B, the pink toner 34P and the transparent toner 34C will be used for the page 62C, and the pink toner 34P will be used for the page 62D.

At the latest settings of the image formation toner unit group 32, the gold toner unit 34G, the yellow toner unit 34Y, the magenta toner unit 34M, the cyan toner unit 34C, the black toner unit 34K, and the white toner unit 34W are attached.

Thus, in the third processing of step S104, since the pink 34P and the transparent 34C1 for the page 62C and the pink 34P for the page 62D are colors of toner units that are not attached at the latest settings of the image formation toner unit group 32, the result of the determination is affirmative.

In the third processing of step S106, since the white toner unit 34W is attached to the image formation toner unit group 32 at the latest settings by the first toner unit replacement, the result of the determination is negative.

In the second processing of step S108, since the gold 34G, the yellow 34Y, and the black 34K, which have not been printed in the page 62B, are able to be printed using the toner units attached at the latest settings of the image formation toner unit group 32, the result of the determination is affirmative.

In the second processing of step S112, the printing order for the print data 62 is determined as described below. Since there is no color that has not been printed in the page 62A, the printing order for the page 62A is not determined. The printing order for the page 62B is determined in the following order from the first to the third: the gold 34G, the yellow 34Y, and the black K. Furthermore, since an attached toner unit is not used and printing is thus not performed for the page 62C, the printing order for the page 62C is not determined. Similarly, the printing order for the page 62D is not determined.

In the second processing of step S114, the CPU 12A performs, based on the page 62B of the print data 62, printing using the gold toner 34G, the yellow toner 34Y, and the black toner 34K.

Figure 9:
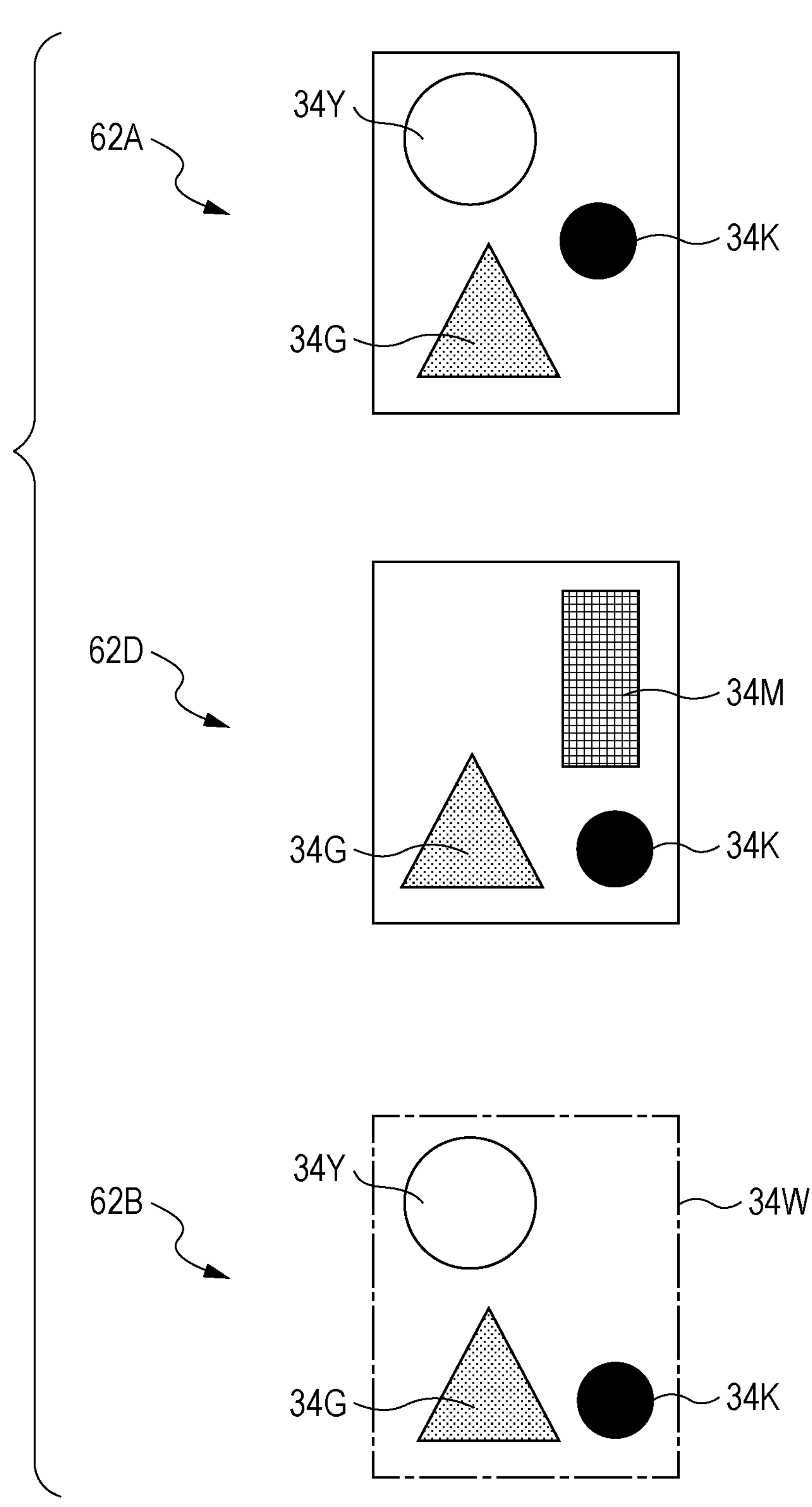
FIG. 9 is a diagram illustrating second printer materials.

FIG. 9 is a diagram illustrating printed materials discharged to the discharge unit 40 by the second printing processing of step S114. A printed material based on the print data 62 obtained by the second printing processing is only the page 62B. In the first processing of step S118, the first printed materials are returned to the printer 1. Thus, the CPU 12A first discharges the printed materials based on the page 62A and the page 62D that are not printed by the second printing processing. Then, the CPU 12A discharges the printed material based on the page 62B that has been printed by the second printing processing. Hereinafter, a printed material discharged by the second printing processing will be referred to as a second printed material. A second printed material includes a first printed material.

In the second processing of step S116, since printing using the pink toner 34P and the transparent toner 34C1 in the page 62C that have been determined to be used in the third processing of step S102 is not performed in the second processing of step S114 and printing using the pink toner 34P in the page 62D that has been determined to be used in the third processing of step S102 is not performed in the second processing of step S114, the result of the determination in the second processing of step S116 is affirmative.

In the second processing of step S118, the second printed materials accumulated in the discharge unit 40 are returned to the printer 1. When the second printed materials are returned to the printer 1, the CPU 12A performs the processing of step S102 again.

The gold 34G, the magenta 34M, and the black 34K in the page 62A, the page 62B, and the page 62D are printed in the first and second processing of printing.

Thus, in the fourth processing of step S102, the CPU 12A determines that the pink toner 34P and the transparent toner 34C1 will be used for the page 62C and the pink toner 34P will be used for the page 62D.

At the latest settings of the image formation toner unit group 32, the gold toner unit 34G, the yellow toner unit 34Y, the magenta toner unit 34M, the cyan toner unit 34C, the black toner unit 34K, and the white toner unit 34W are attached.

Thus, the fourth processing of step S104 and the fourth processing of step S106 are similar to the third processing of step S104 and the third processing of step S106.

In the third processing of step S108, since the pink 34P and the transparent 34C1 that have not been printed in the page 62C are not able to be printed using the toner units attached at the latest settings of the image formation toner unit group 32 and the pink 34P that has not been printed in the page 62D is not able to be printed using the toner units attached at the latest settings of the image formation toner unit group 32, the result of the determination in the third processing of step S108 is negative.

Figures 10, 11:
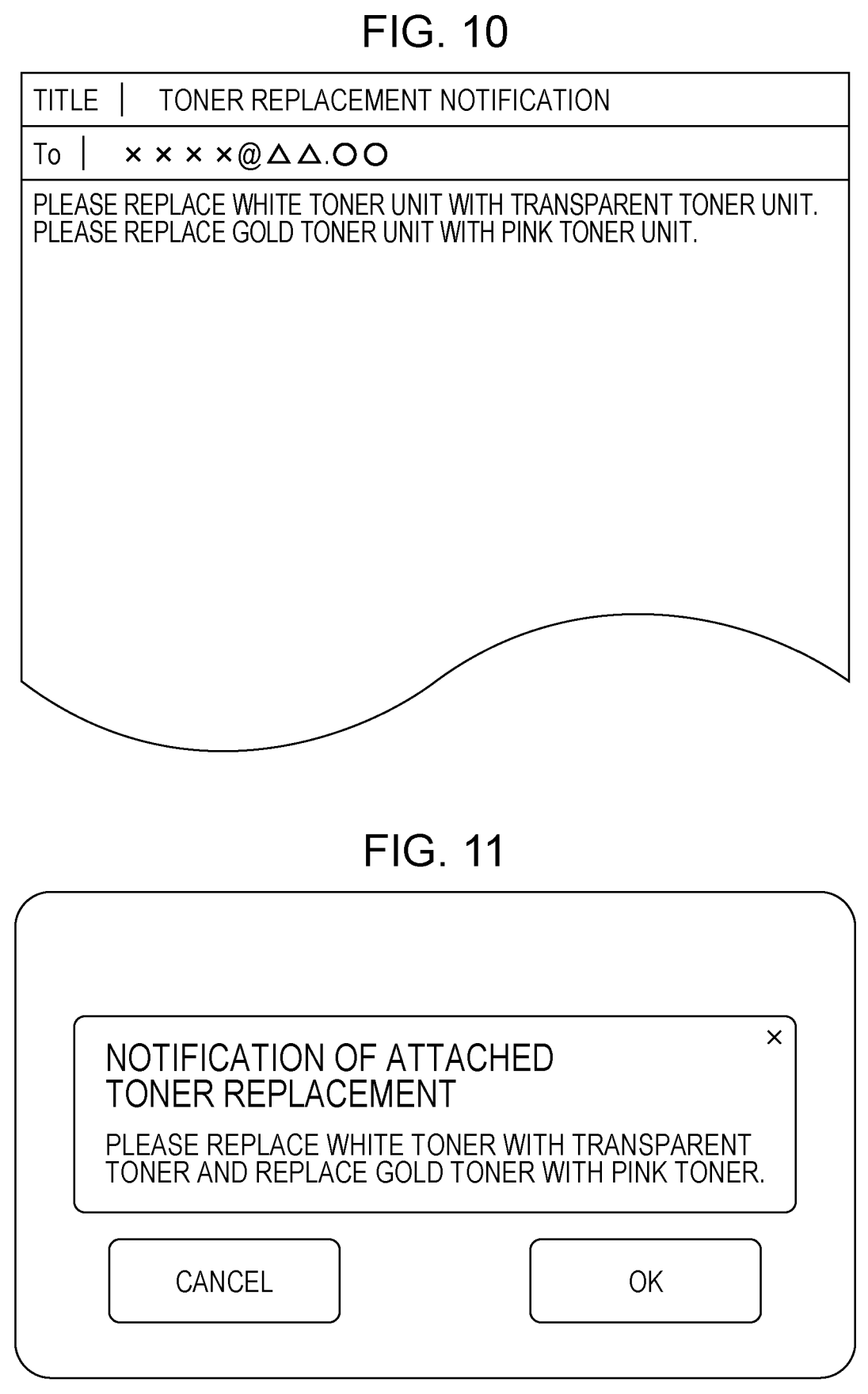

In the second processing of step S110, the CPU 12A outputs, for example, a notification illustrated in FIG. 10 or 11. In response to the notification, toner units of the pink 34P, the yellow 34Y, the magenta 34M, the cyan 34C, the black 34K, and the transparent C1 are attached to the image formation toner unit group 32 at the latest settings in the order in which a recording medium passes through. When the white toner unit 34W and the gold toner unit 34G are replaced with the transparent toner unit 34C1 and the pink toner unit 34P, the fifth processing of step S102 is performed for the print data 62. Replacement of the toner units in the second processing of step S110 is the second toner unit replacement in the processing for the print data 62.

In the fifth processing of step S102, the same determination as that in the fourth processing of step S102 is performed.

In the fifth processing of step S104, since the pink 34P and the transparent 34C1 in the page 62C and the pink 34P in the page 62D are colors of the toner units attached at the latest settings of the image formation toner unit group 32, the result of the determination is negative.

In the third processing of step S112, since there is no color that has not been printed in the page 62A or the page 62B, the printing order for the page 62A and the page 62B of the print data 62 is not determined. The printing order for the page 62C is determined in such a manner that the pink 34P will be printed firstly. The printing order for the page 62D is determined in such a manner that the pink 34P will be printed firstly.

In the third processing of step S114, the CPU 12A performs, based on the page 62C of the print data 62, printing using the pink toner 34P. Furthermore, the CPU 12A performs, based on the page 62D of the print data 62, printing using the pink toner 34P.

Figure 12:
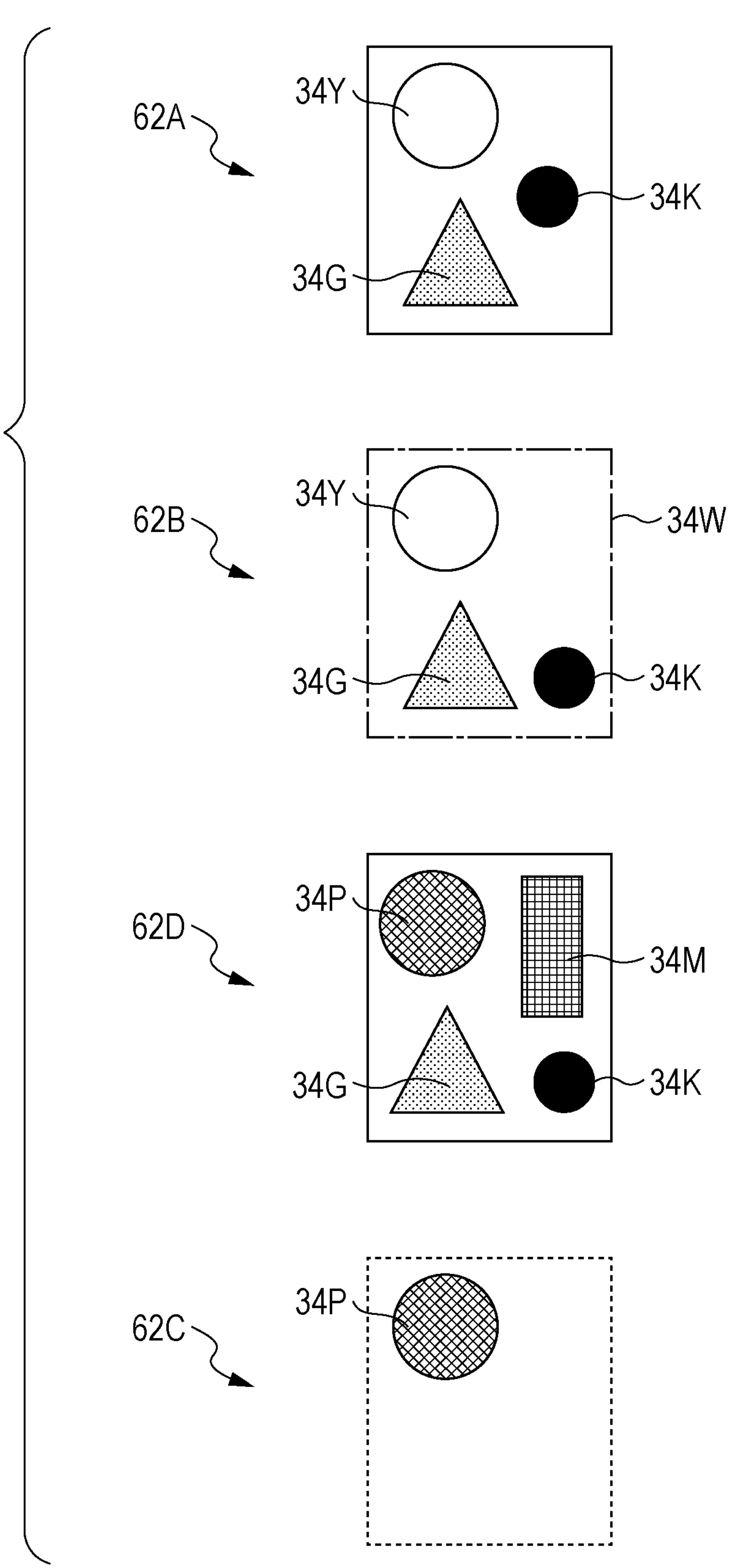
FIG. 12 is a diagram illustrating third printed materials.

FIG. 12 is a diagram illustrating printed materials discharged to the discharge unit 40 by printing in the third processing of step S114. The printed materials based on the print data 62 by the third printing processing are the page 62C and the page 62D. In the second processing of step S118, the second printed materials are returned to the printer 1. Thus, the CPU 12A first discharges the printed materials based on the page 62A and the page 62B that are not printed in the third printing processing. After that, the CPU 12A discharges the printed material based on the page 62C and the printed material based on the page 62D that have been printed by the third printing processing. Hereinafter, a third printed material discharged by the third printing processing will be referred to as a third printed material. A third printed material includes first and second printed materials.

In the third processing of step S116, since printing using the transparent 34C1 in the print data 62 that has been determined to be used in the fifth processing of step S102 is not performed in the third processing of step S114, the result of the determination is affirmative.

In the third processing of step S118, the third printed materials accumulated in the discharge unit 40 are returned to the printer 1. When the third printed materials are returned to the printer 1, the CPU 12A performs the processing of step S102 again.

In the sixth processing of step S102, the CPU 12A determines that the transparent 34C1 will be used for the page 62C.

The sixth processing of step S104 is similar to the fifth processing of step S104.

In the fourth processing of step S112, since there is no color that has not been printed in the page 62A, the page 62B, or the page 62D, the printing order for the print data 62 is not determined. The printing order for the page 62C is determined in such a manner that the transparent C1 will be printed firstly.

In the fourth processing of step S114, the CPU 12A performs, based on the page 62C of the print data 62, printing using the transparent toner 34C1.

Figure 13:
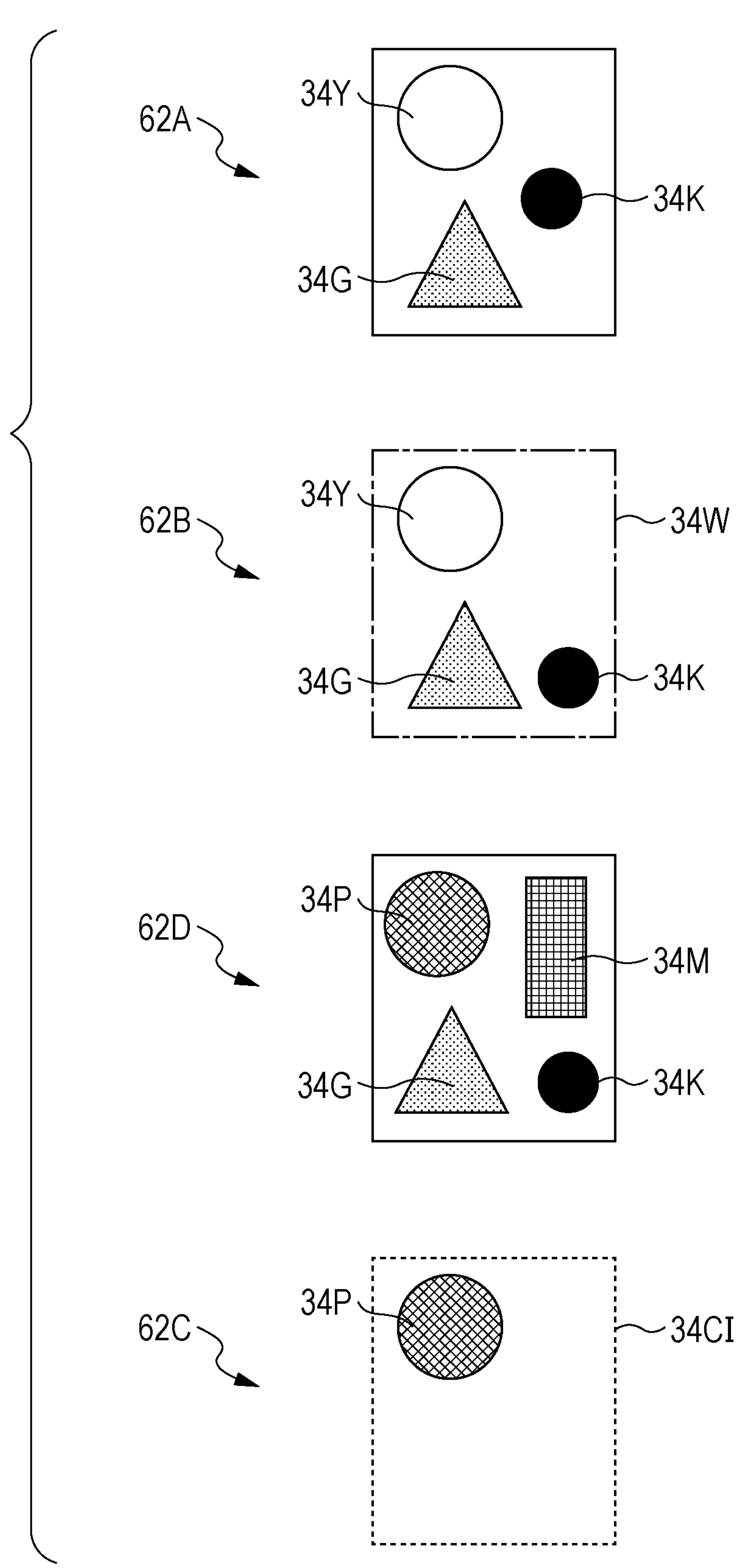
FIG. 13 is a diagram illustrating fourth printed materials.

FIG. 13 is a diagram illustrating printed materials discharged to the discharge unit 40 by the fourth printing processing of step S114. A printed material based on the print data 62 obtained by the fourth printing processing is the page 62C. In the third processing of step S118, the third printed material is returned to the printer 1. Thus, the CPU 12A first discharges printed materials based on the page 62A, the page 62B, and the page 62D that are not printed in the fourth printing processing. After that, the CPU 12A discharges the printed material based on the page 62C that has been printed by the fourth processing of step S114. Hereinafter, a printed material discharged by the fourth printing processing will be referred to as a fourth printed material. A fourth printed material includes first to third printed materials.

In the fourth processing of step S116, since printing using the colors included in the first color group is completed by the fourth printing processing, the result of the determination is affirmative.

In the first processing of step S120, it is determined whether or not sorting is needed. Although the pages of the print data 62 are in the order of the page 62A, the page 62B, the page 62C, and the page 62D, the order of printed materials accumulated in the discharge unit 40 is in the order of the page 62A, the page 62B, the page 62D, and the page 62C. This is because printing based on the page 62C is performed lastly in the fourth processing of step S114. Thus, the result of the determination in the first processing of step S120 is affirmative.

In the first processing of step S122, the CPU 12A returns the fourth printed materials to the printer 1, and discharges the fourth printed materials in the order of the pages of the print data 62. That is, the CPU 12A discharges the printed materials in the order of the page 62A, the page 62B, the page 62C, and the page 62D. When the processing of step S122 is performed, the process based on the printing control program 100 for the print data 62 ends.

With the printing control program 100, the print data 62 including colors, the number of colors included in the print data 62 being larger than the number of colors of toner units attached to the image formation toner unit group 32, is able to be printed.

In the example described above, toner unit replacement is performed twice for printing of the print data 62. However, for example, if printing is performed in the order of pages, because the page 62A is printed and then the white 34W is printed for the page 62B, toner unit replacement is performed once. For example, it is assumed that the gold toner unit 34G is replaced with the white toner unit 34W. Since the gold toner unit 34G is also used for the page 62B, after printing using the white toner unit 34W is performed, the second toner unit replacement needs to be performed. Then, the third toner unit replacement is performed so that the pink 34P is able to be printed in the page 62C, and the fourth toner unit replacement is performed so that the transparent C1 is able to be printed. In this case, toner unit replacement needs to be performed four times to print three pages of the print data 62. However, in this exemplary embodiment, the printing order for the print data is determined in such a manner that the number of times of toner unit replacement is as small as possible, and printing using an attached toner unit is preferentially performed. Therefore, the number of times of toner unit replacement is reduced compared to the case where printing is performed in the order of pages, and the convenience of the user 3 may thus be enhanced. In the process for a single piece of print data, toner unit replacement is able to be performed. Thus, the number of colors that exceeds the number of colors of the second color group may be included in the first color group.

Although an exemplary embodiment has been described above, the technical scope of the present disclosure is not limited to the scope of the exemplary embodiment described above. Various changes or improvements may be made to an exemplary embodiment described above without departing from the gist of the present disclosure, and an aspect obtained by a change or improvement being made is also included in the technical scope of the present disclosure.

As an example of a change or improvement made to an exemplary embodiment, replacement of a toner unit in the process for a single piece of print data may be limited to replacement of a toner unit of a special color. In other words, only replacement of a toner unit of a special color is able to be performed in the process for a single piece of print data, and replacement of a toner unit of a basic color may not be able to be performed.

In this case, the processing of step S104 in FIG. 3 may be performed as "the CPU 12A determines whether or not colors of toners that have been determined to be used for printing include a special color different from a special color of a toner unit attached at the latest settings of the image formation toner unit group 32."

Furthermore, in an exemplary embodiment described above, a case where an image is formed on a recording medium by an electrophotographic system has been described. However, the disclosed technique may be applicable to a case where an image is formed on a recording medium by an inkjet recording system. In this case, instead of toner, ink is used as a color material.

Furthermore, disclosure of claims is not limited to the exemplary embodiments described above, and all the combinations of features described in the exemplary embodiments are not always necessary for the summary of the present disclosure. The foregoing exemplary embodiments include various disclosures, and various disclosures may be extracted by combining a plurality of disclosed constituent elements. Even when some of all the constituent elements disclosed in the exemplary embodiments are removed, an arrangement after the some constituent elements are removed may be extracted as a disclosure as long as an effect is able to be achieved.

In an exemplary embodiment, an aspect in which the printing control program 100 is installed in the storage unit 18 has been described. However, the printing control program 100 is not necessarily installed in the storage unit 18. The printing control program 100 according to an exemplary embodiment may be recorded in a computer-readable recording medium and provided. For example, the printing control program 100 according to an exemplary embodiment may be recorded in an optical disc such as a compact disc-read only memory (CD-ROM) or a digital versatile disc-read only memory (DVD-ROM) or a semiconductor memory such as a universal serial bus (USB) memory or a memory card and provided. Furthermore, the printing control program 100 according to an exemplary embodiment may be acquired from an external device through the communication unit 12G.

In an exemplary embodiment described above, the case where processing of the printing control device 10 is performed by implementation of software configuration using a computer executing a program has been described. However, the processing of the printing control device 10 is not necessarily performed by implementation of the software configuration. For example, information processing may be implemented by a hardware configuration or a combination of a hardware configuration and a software configuration.

Furthermore, the configuration of the printing control device 10 described above in an exemplary embodiment is an example. It is obvious that an unnecessary part may be deleted or a new part may be added without departing from the spirit of the present disclosure.

Similarly, the configuration of the printing unit 30 described above in an exemplary embodiment is an example, and it is obvious that an unnecessary part may be deleted or a new part may be added without departing from the spirit of the present disclosure.

Furthermore, the flow of a process based on the printing control program 100 described above in an exemplary embodiment (see FIG. 3) is an example, and it is obvious that an unnecessary step may be deleted, a new step may be added, or a processing order may be changed without departing from the spirit of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A printing control device comprising:

a processor configured to:

in a case where the number of colors of a first color group including one or more colors included in print data is larger than the number of colors of a second color group including one or more colors that are able to be printed by a printing unit and a color material of a color that has not been printed from the first color group is not attached to the printing unit, issue an instruction to replace any color material attached to the printing unit with the color material of the color that has not been printed from the first color group; and after the color material is replaced, cause the printing unit to print the color that has not been printed from the first color group.

(((2)))

The printing control device according to (((1))), wherein the processor is configured to control, based on the colors included in the first color group and color materials attached to the printing unit, a printing order of the colors of the first color group and a timing at which the color material corresponding to a color included in the second color group is replaced.

(((3)))

The printing control device according to (((2))), wherein the processor is configured to control the printing order in such a manner that the number of times that the color material is replaced is as small as possible.

(((4)))

The printing control device according to (((2))) or (((3))), wherein the processor is configured to rearrange printed materials that have been printed in the printing order into an order of pages of the print data.

(((5)))

The printing control device according to (((2))) or (((3))), wherein the processor is configured to, in a case where the colors included in the first color group include a color that is to be printed lastly, control the printing order in such a manner that the color that is to be printed lastly will be printed lastly.

(((6)))

The printing control device according to (((5))), wherein the color that is to be printed lastly is a transparent color for coating a color that has already been printed.

(((7)))

The printing control device according to any one of (((2))) to (((6))), wherein the processor is configured to, in a case where the colors included in the first color group include a color that is to be printed firstly, control the printing order in such a manner that the color that is to be printed firstly will be printed firstly.

(((8)))

The printing control device according to (((7))), wherein the color that is to be printed firstly is an underlying color that serves as a base.

(((9)))

The printing control device according to any one of (((1))) to (((8))), wherein the second color group includes at least basic colors including yellow, magenta, cyan, and black and a special color that is different from the basic colors, and wherein the number of special colors included in the first color group is larger than the number of special colors included in the second color group.

(((10)))

A printing control program for causing a computer to execute a process comprising:

in a case where the number of colors of a first color group including one or more colors included in print data is larger than the number of colors of a second color group including one or more colors that are able to be printed by a printing unit and a color material of a color that has not been printed from the first color group is not attached to the printing unit, issue an instruction to replace any color material attached to the printing unit with the color material of the color that has not been printed from the first color group; and after the color material is replaced, cause the printing unit to print the color that has not been printed from the first color group.

What is claimed is:

1. A printing control device comprising:

a processor configured to:

in a case where the number of colors of a first color group including one or more colors included in print data is larger than the number of colors of a second color group including one or more colors that are able to be printed by a printing unit and a color material of a color that has not been printed from the first color group is not attached to the printing unit, issue an instruction to replace any color material attached to the printing unit with the color material of the color that has not been printed from the first color group; and after the color material is replaced, cause the printing unit to print the color that has not been printed from the first color group;

control, based on the colors included in the first color group and color materials attached to the printing unit, a printing order of the colors of the first color group and a timing at which the color material corresponding to a color included in the second color group is replaced.

2. The printing control device according to claim 1, wherein the processor is configured to control the printing order in such a manner that the number of times that the color material is replaced is as small as possible.

3. The printing control device according to claim 1, wherein the processor is configured to rearrange printed materials that have been printed in the printing order into an order of pages of the print data.

4. The printing control device according to claim 1, wherein the processor is configured to, in a case where the colors included in the first color group include a color that is to be printed lastly, control the printing order in such a manner that the color that is to be printed lastly will be printed lastly.

5. The printing control device according to claim 4, wherein the color that is to be printed lastly is a transparent color for coating a color that has already been printed.

6. The printing control device according to claim 1, wherein the processor is configured to, in a case where the colors included in the first color group include a color that is to be printed firstly, control the printing order in such a manner that the color that is to be printed firstly will be printed firstly.

7. The printing control device according to claim 6, wherein the color that is to be printed firstly is an underlying color that serves as a base.

8. The printing control device according to claim 1, wherein the second color group includes at least basic colors including yellow, magenta, cyan, and black and a special color that is different from the basic colors, and wherein the number of special colors included in the first color group is larger than the number of special colors included in the second color group.

9. The printing control device according to claim 2, wherein the second color group includes at least basic colors including yellow, magenta, cyan, and black and a special color that is different from the basic colors, and wherein the number of special colors included in the first color group is larger than the number of special colors included in the second color group.

10. The printing control device according to claim 3, wherein the second color group includes at least basic colors including yellow, magenta, cyan, and black and a special color that is different from the basic colors, and wherein the number of special colors included in the first color group is larger than the number of special colors included in the second color group.

11. The printing control device according to claim 4, wherein the second color group includes at least basic colors including yellow, magenta, cyan, and black and a special color that is different from the basic colors, and wherein the number of special colors included in the first color group is larger than the number of special colors included in the second color group.

12. The printing control device according to claim 5, wherein the second color group includes at least basic colors including yellow, magenta, cyan, and black and a special color that is different from the basic colors, and wherein the number of special colors included in the first color group is larger than the number of special colors included in the second color group.

13. The printing control device according to claim 6, wherein the second color group includes at least basic colors including yellow, magenta, cyan, and black and a special color that is different from the basic colors, and wherein the number of special colors included in the first color group is larger than the number of special colors included in the second color group.

14. The printing control device according to claim 7, wherein the second color group includes at least basic colors including yellow, magenta, cyan, and black and a special color that is different from the basic colors, and wherein the number of special colors included in the first color group is larger than the number of special colors included in the second color group.

15. A printing control method comprising:

in a case where the number of colors of a first color group including one or more colors included in print data is larger than the number of colors of a second color group including one or more colors that are able to be printed by a printing unit and a color material of a color that has not been printed from the first color group is not attached to the printing unit, issuing an instruction to replace any color material attached to the printing unit with the color material of the color that has not been printed from the first color group;

after the color material is replaced, causing the printing unit to print the color that has not been printed from the first color group; and controlling, based on the colors included in the first color group and color materials attached to the printing unit, a printing order of the colors of the first color group and a timing at which the color material corresponding to a color included in the second color group is replaced.

16. A non-transitory computer readable medium storing a program causing a computer to execute a process for printing control, the process comprising:

in a case where the number of colors of a first color group including one or more colors included in print data is larger than the number of colors of a second color group including one or more colors that are able to be printed by a printing unit and a color material of a color that has not been printed from the first color group is not attached to the printing unit, issuing an instruction to replace any color material attached to the printing unit with the color material of the color that has not been printed from the first color group;

after the color material is replaced, causing the printing unit to print the color that has not been printed from the first color group; and controlling, based on the colors included in the first color group and color materials attached to the printing unit, a printing order of the colors of the first color group and a timing at which the color material corresponding to a color included in the second color group is replaced.

* * * * *